US008880731B2

(12) United States Patent
Behrens

(10) Patent No.: US 8,880,731 B2
(45) Date of Patent: Nov. 4, 2014

(54) METHOD, SYSTEM AND DEVICE FOR CONTROLLING AND/OR LIMITING ELECTRONIC COMMUNICATION

(76) Inventor: Philip Behrens, Sperryville, VA (US)

( * ) Notice: Subject to any disclaimer, the term of this patent is extended or adjusted under 35 U.S.C. 154(b) by 497 days.

(21) Appl. No.: 12/348,166

(22) Filed: Jan. 2, 2009

(65) Prior Publication Data

US 2009/0132655 A1 May 21, 2009

Related U.S. Application Data

(63) Continuation of application No. PCT/US2007/082632, filed on Oct. 26, 2007.

(30) Foreign Application Priority Data

Oct. 26, 2006 (DE) .......................... 10 2006 050 639
Oct. 26, 2007 (EP) ....................................... 1873669

(51) Int. Cl.
G06F 15/16 (2006.01)
H04M 3/42 (2006.01)
H04M 1/66 (2006.01)
G06F 17/30 (2006.01)
H04N 7/16 (2011.01)

(52) U.S. Cl.
USPC ........ 709/245; 709/204; 455/410; 455/414.1; 726/30

(58) Field of Classification Search
USPC .......................................................... 709/245
See application file for complete search history.

(56) References Cited

U.S. PATENT DOCUMENTS

| 2002/0147912 | A1* | 10/2002 | Shmueli et al. | ................ 713/182 |
| 2003/0131263 | A1 | 7/2003 | Keane et al. | |
| 2005/0164675 | A1* | 7/2005 | Tuulos et al. | ................. 455/410 |
| 2005/0285740 | A1 | 12/2005 | Kubach et al. | |
| 2006/0046692 | A1* | 3/2006 | Jelinek et al. | ................. 455/411 |
| 2006/0090067 | A1* | 4/2006 | Edmonds et al. | ............. 713/159 |
| 2006/0117378 | A1 | 6/2006 | Tam et al. | |
| 2006/0140200 | A1 | 6/2006 | Black et al. | |
| 2006/0168186 | A1* | 7/2006 | Mathew et al. | ................ 709/223 |
| 2013/0080529 | A1* | 3/2013 | Appelman et al. | ............ 709/204 |
| 2013/0095859 | A1* | 4/2013 | De Vries | .................... 455/456.3 |

FOREIGN PATENT DOCUMENTS

| DE | 42 36 778 A1 | 5/1994 |
| DE | 100 00 963 A1 | 8/2001 |
| DE | 10 2005 009 504 B3 | 3/2006 |
| EP | 1 487 169 A2 | 12/2004 |
| EP | 1 487 169 A3 | 12/2004 |
| WO | WO 2004/062131 A1 | 7/2004 |
| WO | WO 2004/088943 A2 | 10/2004 |
| WO | WO 2006/064480 A1 | 6/2006 |

* cited by examiner

Primary Examiner — Evans Desrosiers
(74) Attorney, Agent, or Firm — B. Y. Mathis

(57) ABSTRACT

Devices and methods are provided that spatially restrict online communications to persons from a real world meeting. Such restriction, with optional supervisory control by an authority, protects children from online predators, and can facilitate communication with known friends. An embodiment provides a portable access control (AC) device having a spatially-restricted (SR) communication port that communicates over a short range. The AC device has a unique identifier (UID) that identifies the AC device and the owner of the AC device. The user collects UIDs (using the SR port) from other people having AC devices, and stores the collected UIDs in a friendlist. When communicating by Internet, discrimination software restricts communication from people who do not have UIDs in the friendlist. The discrimination software can operate on a user's computer or on a remote server. Embodiments provide protected email, instant messaging, voice communication, gaming activities, and video links.

20 Claims, 16 Drawing Sheets

Access Control (AC) Device

Two AC Devices Exchanging UIDs

Group 1: A, B, C
Group 2: B, C, D

METHOD, SYSTEM AND DEVICE FOR CONTROLLING AND/OR LIMITING ELECTRONIC COMMUNICATION

RELATED APPLICATIONS

This application is a continuation of, and claims priority to, each of prior German patent application No. 10 2006 050 639 1 filed on 26 Oct. 2006, EP application No. EP1873669 filed on 26 Oct. 2007, PCT application No. PCT/US2007/082632 filed on 26 Oct. 2007, and U.S. provisional Application No. 61/108,487 filed on 1 Jan. 2008. The entire content of each of the above-listed applications is incorporated herein by reference.

FIELD OF THE INVENTION

The invention relates to an apparatus and method for limiting Internet communications to known persons.

BACKGROUND OF INVENTION

Children spend an increasing amount of time surfing and communicating over the Internet. There are many online communities, chat rooms, and social networking services, which facilitate these activities, such as Yahoo.com, Skype.com, MySpace.com, Facebook.com, Webkinz.com and the like.

Communication with anonymous persons over the Internet presents well-known and publicized security concerns, especially for children. Online children can become the targets of criminals, identity thieves, sexual predators, etc. Presently, it can be impossible for a parent or guardian to know with whom a child is communicating online. Further, it can be more difficult for a parent or guardian to prevent strangers or online predators from communicating with a child. The problem of protecting children from online dangers has not been solved.

Children urgently need protection from online predators and criminals. It would be particularly useful to provide parents with a secure, convenient, and automated system for limiting and selecting the people that have Internet-based communication with a child. Parents and other authorities need a system that can limit Internet communication to acceptable entities such as people that a child knows and has met personally. Also, it would be useful to provide parents with control over who can communicate with a child. Attempts to address these problems have been insufficient. For example, EP1755060 to Nakajima describes restricted use of portable game consoles that require the use of a single device (i.e. terminal) for local and remote communication. Nakajima also employs automated identifier exchange, thereby eliminating personal control over communications. Furthermore, parental control and plenary review are missing.

SUMMARY OF THE INVENTION

Embodiments of the invention provide an access control (AC) device that helps a child identify known persons on the Internet. The AC device exchanges unique identifiers (UIDs). The UIDs allows secure and reliable identification of persons. The UIDs are used to avoid or prevent communication with other persons that are not known to a user.

The AC device has an associated UID. The AC device also has a first communications port for communicating with computers connected to the Internet, and a second communications port for communicating with other AC devices. Alternatively, a single communications port handles both types of communication, namely with computers connected to the Internet and with other AC devices. In use AC devices exchange UIDs in a spatially-restricted manner, meaning over a limited range or limited direction, generally via the second port. Communication via the second ports (i.e. between AC devices) is spatially restricted in that communication is only possible over a limited range or limited direction. This feature assures that when two AC devices exchange UIDs the AC devices are close together such the users of the AC devices are aware of the UID exchange. UIDs stored in the AC devices comprise a friendlist and indicate persons with whom an AC device user is personally familiar.

The second (spatially restricted) port can be a line of sight optical port, a short-range wireless port or a hardware connection, or an audio port for example.

The first communication port can be a universal serial bus (USB) port, for example.

A personal identification code can be required for an AC device to exchange UIDs with another AC device.

The UID can be a secret code inaccessible to a user.

Embodiments comprise an access control system including an AC device, and a computer connectable to the Internet. The computer includes discrimination software that restricts communication between people unless they have exchanged UIDs. At least one of a sender and a recipient must have the other's UID.

Embodiments also provide a communication method for facilitating secure communication. In the method, UID are exchanged between AC devices, the UIDs (in a friendlist) are uploaded to a computer, and then communications between a sender and recipient is restricted unless at least one of the sender or the recipient has the others UID in a friendlist.

BRIEF DESCRIPTION OF THE DRAWING FIGURES

DETAILED DESCRIPTION OF INVENTION

Definitions

Figure 1:
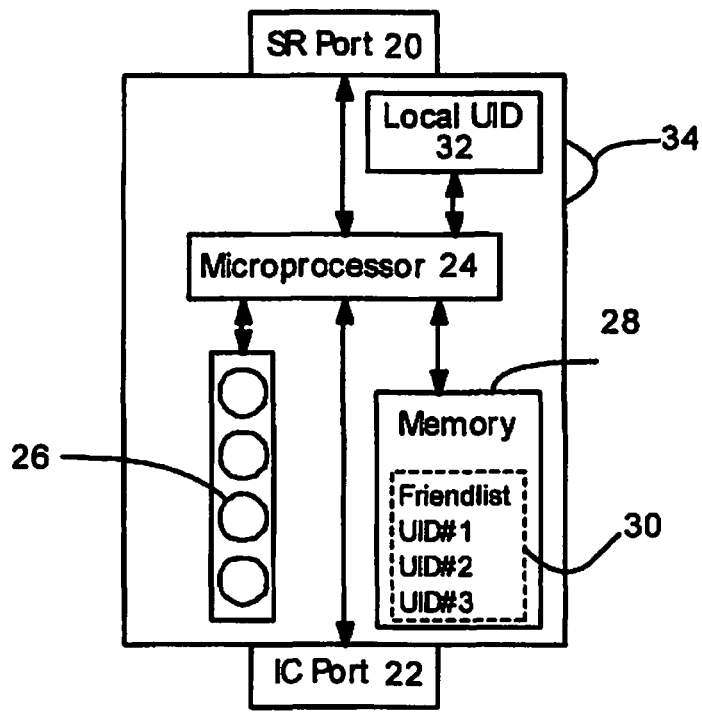
FIG. 1 shows a schematic diagram of an exemplary access control (AC) device.

For assistance in understanding the claims, definitions are provided, along with further exemplary embodiments of their use.

Spatially-restricted Communication ("SR Communication") is communication that is limited in distance or direction. Examples of spatially restricted communication include: 1) wireless link with a range of less than 0.1, 1, or 20 meters, 2) line-of-sight communication link such as infrared links, 3) very short range inductively or capacitively coupled communication link, and 4) electrical connectors requiring physical contact. Wireless communication beyond a range of 20 meters is not spatially-restricted in a preferred embodiment.

Unique identifier (UID): A code, number, address or other symbol that uniquely identifies an AC device, and, by association, the owner of the AC device.

Access control (AC) device: A portable electronic device having a unique UID, and an ability to exchange UIDs with other AC devices via a spatially-restricted communication link.

Communication network: A network for facilitating data, voice or video communication. Examples include the Internet, cellular telephone networks, telephone networks, wireless networks and the like.

Computer: Any electronic device capable of processing electronic data. Personal computers cell phones and PDAs are examples of computers in the appended claims.

Authority: An authority is a supervisor such as a parent, employer, school, agency, or master computer. The authority has the capability to intercept restricted communication attempts and to allow a single communication or may allow an exception by adding an otherwise restricted UID to a friendlist. In an embodiment, the authority may query a trusted website having a list of recommended safe sites, and enter recommended UIDs to the friendlist.

Manual Input: A manual input is an electronic input to the AC device that can be performed manually. Typically, a manual input occurs via a button but can also comprise making an electrical connection between an AC device and an electrical connector, entering a code with a keypad, touching a touch screen, opening a flip phone or activating another electronic input apparatus. Manual input can also be triggering of a mechanism (e.g. button or lever) activated by pressing two AC devices together.

An embodiment provides an apparatus and method for limiting online communications to persons familiar from a face-to-face real world meeting. An embodiment protects children from online predators, spammers, and criminals while simultaneously facilitating communication with known friends.

An embodiment provides a portable access control (AC) device that has a communication port for spatially-restricted (SR) communication (e.g. short-range wireless or infrared), and a port for communication with a computer connected to the Internet (e.g. a USB port). The spatially restricted communication port can only communicate with other AC devices in the local vicinity. Each AC device has an associated unique identifier (UID), which is also associated with the owner of the AC device. Also, each AC device includes a memory for storing the UIDs of other AC devices received via the SR port. In operation, when two children meet and wish to have future Internet contact, the AC devices associated with the two children are linked via the SR port. When manually prompted, the AC devices exchange UIDs via the SR ports and each AC device stores the received UID in memory. Then, when a child is online, the UIDs from the AC device are uploaded onto an Internet-connected computer and used to create a friendlist of persons familiar to the child. While online, the child is by default permitted to only communicate with persons having UIDs in the child's friendlist.

The spatially-restricted nature of communication via the SR port assures that the AC device will only have UIDs associated with known, safe and familiar people that the child or user has met in person. The spatially-restricted nature of the SR port communication assures that strangers unfamiliar to the child will not be able to exchange UIDs with the child's AC device.

SPECIFIC EXAMPLES

Turning to the figures, representative examples are described next.

FIG. 1 shows a schematic diagram of an access control (AC) device according to an embodiment. The AC device can be a portable handheld unit that is powered by batteries, for example. The AC device has a spatially-restricted (SR) communication port 20 for communicating with other AC devices. The C device also has a computer connection (CC) port 22 for communication with a computer or other device connected to the Internet, telecom network (e.g. cellular phone network, instant messaging or paging network, short messaging service (SMS), multimedia messaging system (MMS) network or the like). Both ports 20 22 communicate with a microprocessor 24 that controls the operation of the AC device and communicates with external devices. The microprocessor may have software implemented in hardware, or it may be a reprogrammable microprocessor. The AC device may further include indicator lights 26 that indicate the status of internal functions and state of the microprocessor. Also, a memory 28 is provided, which can be FLASH memory, for example. The AC device has a local unique identifier (local UID) 32 that is unique for each AC device. The local UID can be a binary number, email address or other code that identifies the AC device, and by association its owner or user. The local UID can be stored in the memory 28, or can be stored in nonvolatile memory or fuse/antifuse programmable read only memory (PROM) for example. The AC device can also have an external manual input such as a button 34 or keypad (not shown) so that the user can control operation of the AC device.

The SR port 20 is a communications port that communicates only within a limited range or a limited direction. For example, the SR port can be a very short range wireless communication port with a range of less than 1 or 5 meters, or less than 10 centimeters. Alternatively, the SR port can be an optical or infrared communication port that communicates over a limited range or limited direction (e.g. line of sight).

The CC port 22 can be a conventional universal serial bus (USB) port or the like. The CC port allows the AC device to communicate with an Internet-capable personal computer. The AC device may also communicate over the Internet with a remote Internet server (e.g. via a USB connection to a local personal computer). Also, the CC port can be a conventional wireless Internet port (e.g. employing Bluetooth or Wireless LAN according to one of the 802.11b/a/g/n standards).

Figure 2:
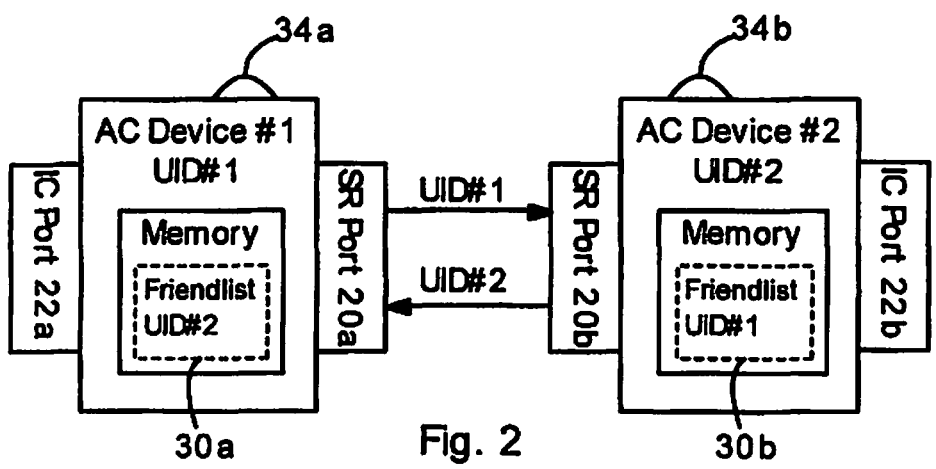
FIG. 2 shows two AC devices exchanging unique identifiers (UIDs).

FIG. 2 shows two AC devices in use. When two AC device owners meet and wish to enable future communication over the Internet, the two AC devices are positioned and/or oriented so that the SR ports 20a 20b are linked. Then, in response to a manual input such as pressing buttons 34a 34b, the AC devices exchange UIDs. AC device #1 receives UID #2 and stores it in friendlist 30a Similarly, AC device #2 receives UID #1 and stores it in friendlist 30b. The exchange of UIDs is preferably initiated when the AC device users press buttons 34a 34b. For example, the exchange of UIDs may require simultaneous activation of the buttons 34a 34b. The buttons can be located and designed to be activated by pressing the AC devices against one another. Alternatively, exchange of the UIDs may occur in response to electrically connecting the AC devices with a physical electrical connection. The term "manual input" thus also includes making a physical electrical connection.

Figure 3:
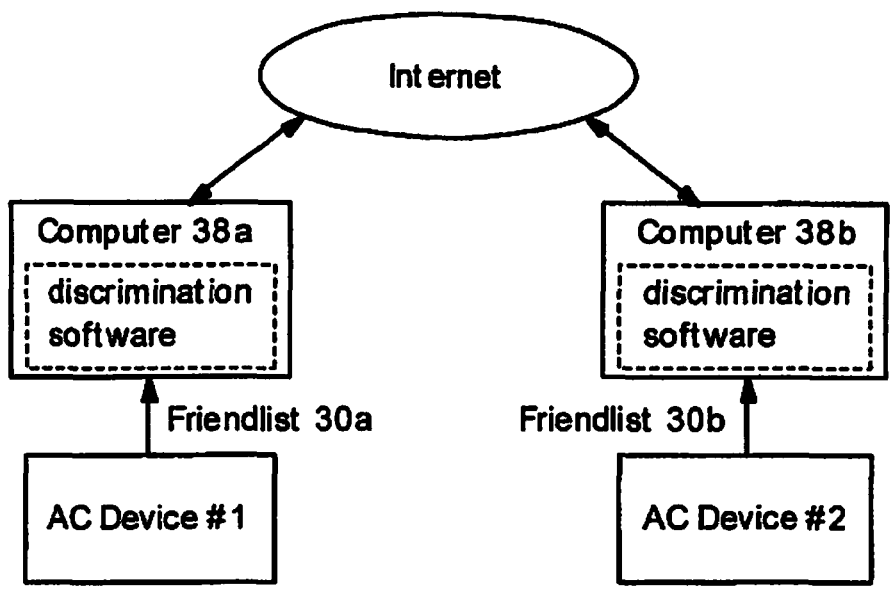
FIG. 3 shows two AC devices uploading friendlists to personal computers used to access the Internet.

FIG. 3 shows the AC devices uploading the friendlists 30a 30b onto computers 38a 38b used to access the Internet. When the owners of the AC devices need to communicate via the Internet, the friendlists are used to determine if people are known and accepted. Friendlists can also be used for identifying people. Specifically, the friendlists 30a 30b are provided to discrimination software in each computer 38a 38b. Each message or communication sent by computers 38a 38b is appended with the UID of the message sender. When a message is received the appended UID is compared to the stored friendlist to determine if the sender of the message is known and familiar.

It is noted that the discrimination software can be incorporated (e.g. as a plug-in) into instant messaging software, blogging software, or email client software (e.g. Yahoo Messenger, Skype, Eudora, Microsoft Outlook, etc.) stored on computers 38a 38b. The messaging or email software on the computers can be instructed to discriminate against communication from persons who do not have UIDs in the user's friendlist.

Figure 4:
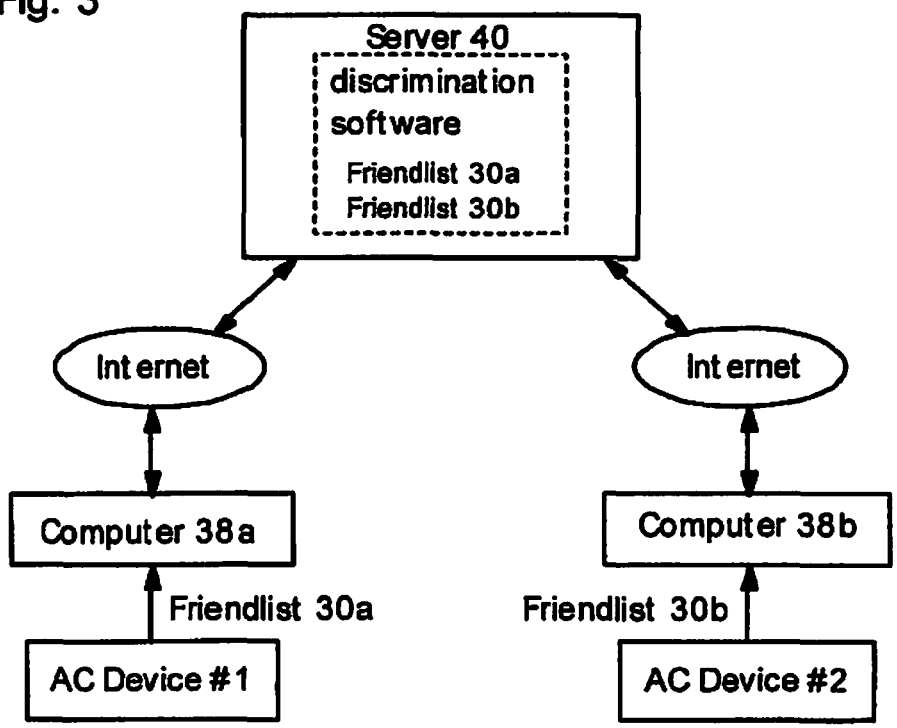
FIG. 4 shows two AC devices uploading friendlists to a server via the Internet. The server provides communication (e.g. email, IM, video, audio) between the computers.

FIG. 4 shows another embodiment in which a server 40 provides message filtering and discrimination. In use, friendlists 30a 30b are uploaded from the AC devices, through computers 38a 38 to server 40. Server 40 can be operated by an Internet media or communications company (e.g. yahoo.com, google.com, skype.com, webkinz.com) or by an Internet service provider, for example. Server 40 includes discrimination software that filters or removes messages which do not have appended UIDs that match a UID in the recipient's friendlist.

Figure 5A:
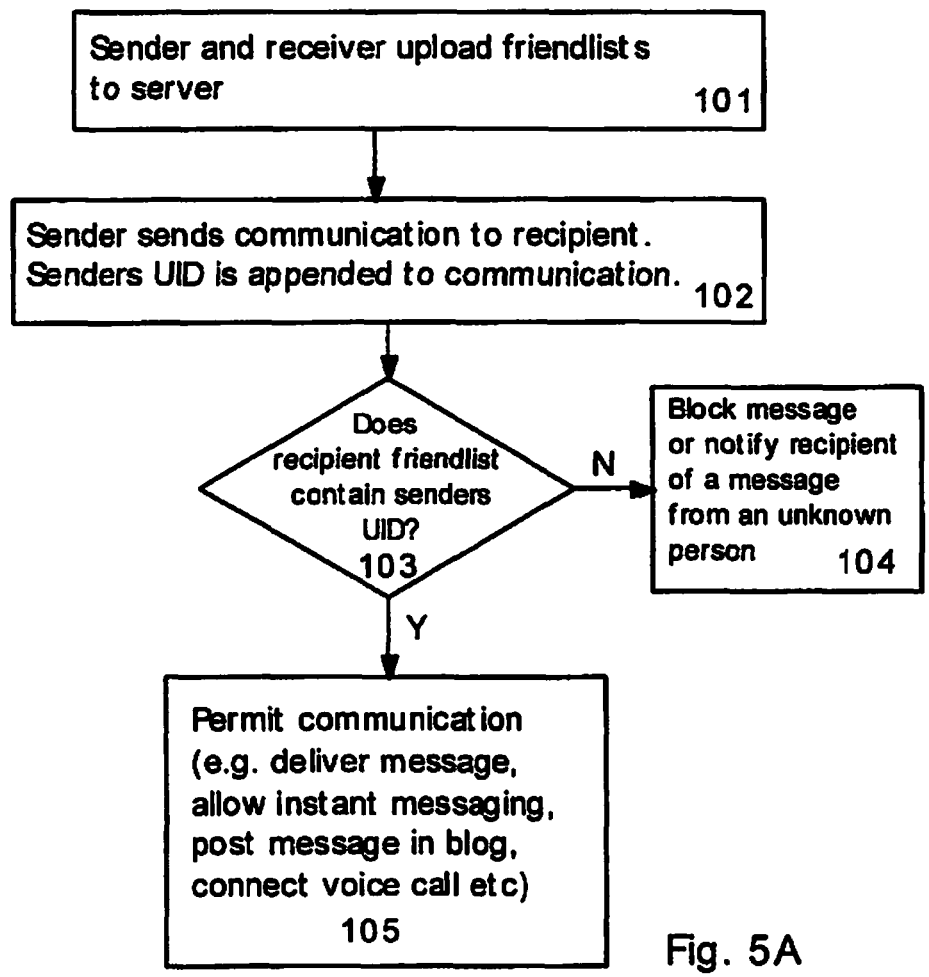
FIG. 5 shows a flow chart illustrating operation of the discrimination software.
Figure 5B:
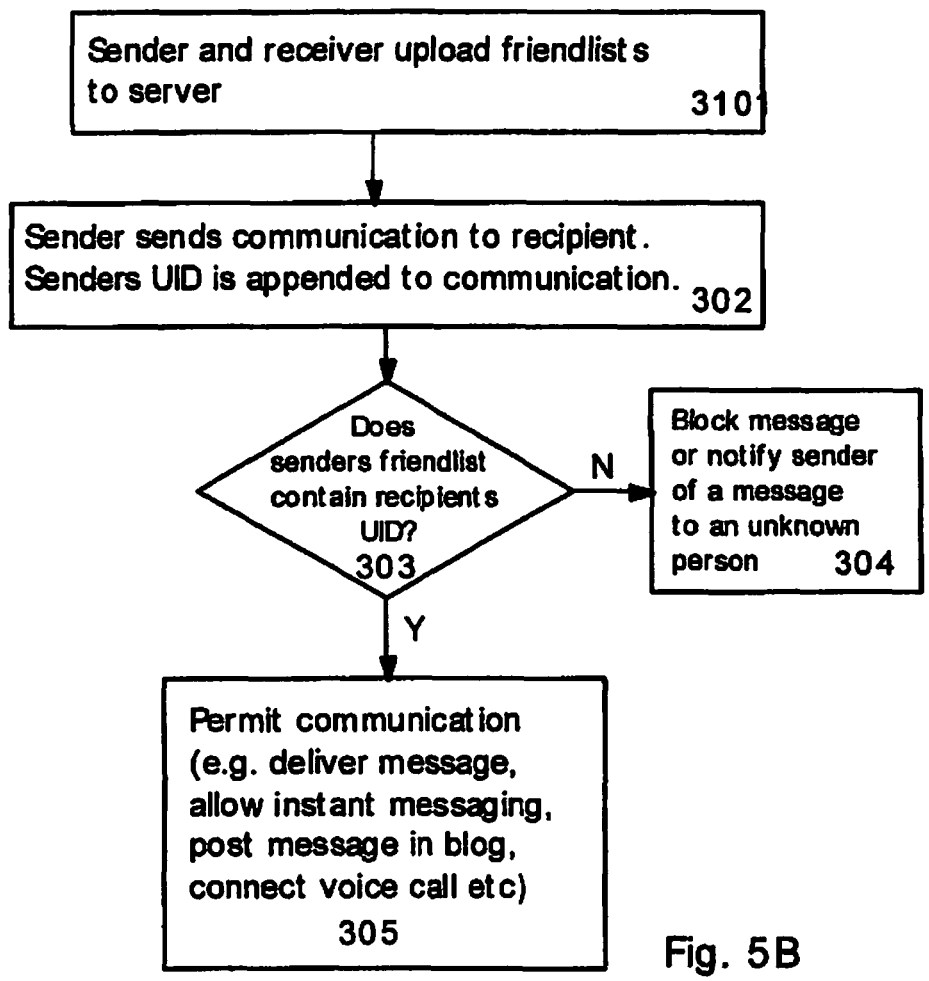
Figure 6:
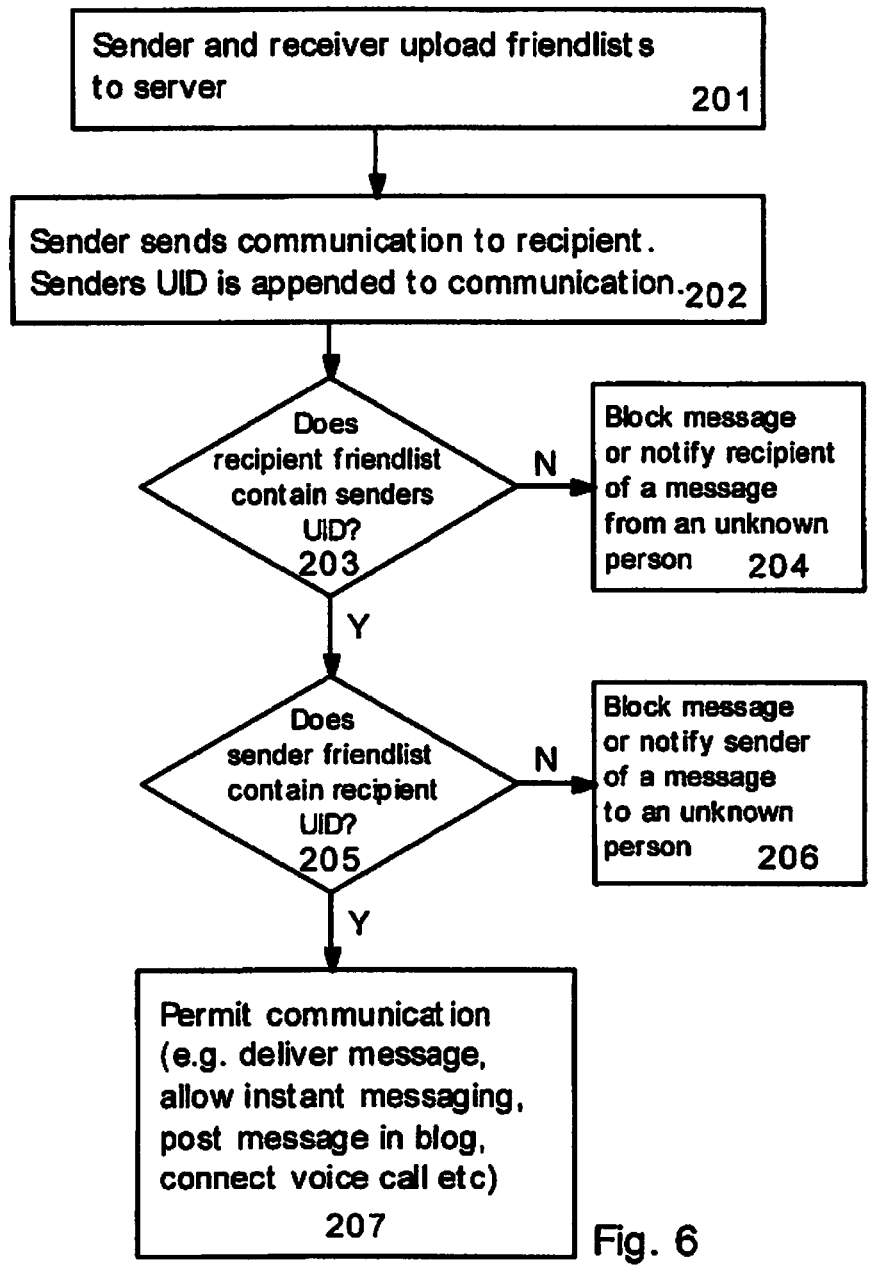
FIG. 6 shows a flow chart illustrating operation of the discrimination software in an alternative embodiment.

FIGS. 5A, 5B and 6 show flowcharts describing operation of the discrimination software according to an embodiment illustrated in FIG. 4. The steps proceed as follows:

Step 101/201/301: The friendlists of at least two users (sender and recipient) are uploaded to Internet communications server 40. Server 40 facilitates communications between two users. Communications between the users can be via instant messaging, email, chat room posting, voice communications, video communications or the like. Also, multiple connected servers can be used.

Step 102/202/302: The communication sent by sender has the senders UID appended. The UID can be embedded in an image or video stream, or can be provided in the header information of an email or other message. The appended UID can be hidden, encrypted, or can be available for view. The UID can be an email address for example.

Step 103/203: The discrimination software searches the recipient's friendlist 32 for the senders UID.

Step 104/204: If the sender's UID is not found in the recipient's friendlist, then the message is rejected, deleted, stored in a separate file or mailbox, otherwise quarantined, or sent to the authority. In an embodiment where the message is sent to the authority, a cell phone, other text message receiving device, or personal computer, for example, may receive the message. The authority optionally may instruct the system to allow the one communication or can instruct the addition of the new UID to the friendlist and allow delivery of subsequent messages as well. The rejected message may be hidden from view, or may be accessible via a password or by accessing the rejected message mailbox. Recipient may be notified of a message from an unfamiliar or unknown sender. The discrimination software may attempt verification of the senders UID for a specified amount of time or a specified number of verification attempts.

Step 105/207: If the recipient's friendlist contains the UID of the sender, then the communication is delivered. The presence of the senders UID in the recipient's friendlist confirms that the sender is known to the receiver.

Steps 205 and 206 provide additional, optional functionality and security. Specifically, these steps require two-way UID exchange for communication:

Step 205: The sender's friendlist is searched for the receiver's UID. The recipient will only receive messages from people that have obtained the recipients UID.

Step 206: If the sender does not have access to the receiver's UID, then the message can be blocked, quarantined, trashed or sent to an Authority for review. Step 206 protects the receiver from messages that could come from unknown people that have illegitimately inserted their UID into the recipients account. This provides an additional measure of security and is optional. Also, notification can be sent to the sender that the sender does not have the recipients UID. Also notification can be sent to the sender that the message did not reach the recipient.

It is noted that steps 203 and 205 can be performed in reverse order from what is shown in FIG. 6. Specifically, step 205 can be performed before step 203.

FIG. 5B shows a flowchart of an embodiment in which the senders friendlist is used for verification.

Step 303: The sender's friendlist is searched for the receiver's UID. The recipient will only receive messages from senders that have obtained the recipients UID.

Step 304: If the sender does not have access to the receiver's UID, then the message can be blocked, quarantined, trashed or sent to an Authority for review.

Embodiments optionally use the sender's friendlist, the recipient's friendlist, or both.

It is noted that the operation of the discrimination software is similar or the same in the embodiment of FIG. 3 where the friendlists and discrimination software are executed on the computers 38a 38b. The methods illustrated in FIGS. 5 and 6 can both be implemented in the embodiment of FIG. 3.

Embodiments of the AC device and method are very effective for protecting children from online predators. Messages and communications sent to children can be blocked unless the child has met the person in everyday life, and has stored the senders UID in the child's AC device. In this way, a child can have access to Internet communication without fear of being vulnerable to online predators and criminals.

The present AC device can be implemented in many different ways. For example, the present AC device can be:

1) A cell phone. In this embodiment, special software can be provided on the cell phone so that it provides the functionality described herein. The SR port can be the built-in microphone and speaker system. In this case, the UIDs are exchanged via audio signals transmitted between the phones.

2) An electronic toy or game such as, for example the well known Tamagotchi. The game or toy may or may not have a screen.

3) A keychain device. In this embodiment, the AC device might not have a screen.

4) A wristwatch or other wearable device.

It is noted that the manual button 34 can be replaced with a keypad (e.g. a numerical keypad). In this case, the exchange of UIDs can require entry of a secret code or personal identification number (PIN). Use of a PIN will provide an added level of security and will prevent unauthorized persons from inserting their UIDs into the AC device.

Of course, the AC device can exchange UIDs with more than one or two other AC devices. The friendlist can have an essentially unlimited number of UIDs.

Figure 7:
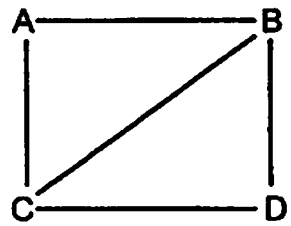
FIG. 7 is a diagram illustrating organization of four users A, B, C, D into two user groups.

Also, users can be organized into groups where every user has exchanged UIDs with every other member of the group. Organization into familiar groups facilitates collaboration on wiki websites and the like. This aspect is illustrated in FIG. 7. In this illustration, A, B, C, and D are 4 different users. Lines indicate UID exchanges. All four users have exchanged UIDs except users A and D have not exchanged UIDs. Hence, A and D cannot be in the same communication group. The four users can be organized into two groups: group 1 with A, B, C, and group 2 with users B, C, D.

Also, it is noted that personal contact information (e.g. name, phone number, email address, physical address) can be exchanged when the UIDs are exchanged. The personal contact information can be correlated with the UID or can be stored separately so that a hacker would have difficulty determining the correspondence between personal contact information and UID.

An advantage of some embodiments is that the UIDs remove anonymity of Internet communication and provide transparency. In prior art methods, discovery of a person's true identity requires tracking an Internet protocol (IP) address. This is time consuming and expensive. With the present AC device and method, UIDs provide much faster and more efficient tracking and identification of individuals on the Internet.

The present AC devices can be sold in groups that will only accept UIDs from other AC devices within the pre-established group. For example, every child at a particular school can be provided with an AC device. The AC devices will only exchange UIDs with AC devices belonging to children at the same school. This feature will provide an added level of protection and security. Alternatively, the AC devices may be provided by the school with pre-established friendlists (according to classes, for example). Furthermore, the school can have access to a supervisor or parental account to be able to monitor and modify usage.

The present AC devices can be used to provide protected communication for many different groups and organizations. For example, the AC device can be issued to employees of a company or government agency who must be informed about the true identity of people on the Internet. For example, if a company has an employee group working on wiki documents (where several members can enter changes into a document), it may be important to securely establish the identity of people that have access to the wiki. Hence, the present AC device can overcome security problems associated with conventional password protected websites. Furthermore, embodiments provide an authority that can review messages from unaccepted senders or the contents of unaccepted websites and allow limited or permanent access upon review. Such review can occur in real time, or off line in batch mode. The latter embodiment is particularly useful for employers who provide internet access to their employees during their work, but need to limit unrestricted browsing to maintain workplace productivity.

In another embodiment, the friendlist is used to determine social networks and links between users with UIDs. For example, a user can provide personal information (e.g. geographical location, name, interests, photographs, blog messages, club or team memberships, school attendance etc), which is associated with the UID. The server can map together data from users according to close geographical locations, common schools, or members of the same clubs. Then, the server can link users to other people with exchanged UIDs that have shared interests or memberships.

Also, the personal information can be stored at the server and published on an Internet page. Access to this Internet page is optionally restricted according to the discrimination software (i.e. only users that have exchanged UIDs with the Internet page publisher can access the Internet page).

Also, personal information (e.g. name of a school attended) can be encoded in the UID. This will simplify the task of finding other users on the friendlist that attend the same school.

Hence, the present AC device and method can be an aid for establishing and maintaining social networks over the Internet. The present AC device provides this service while protecting children and others from online threats and criminals.

Typically, the UID will not be viewable or modifiable by any user. The UID can be coded in hardware of the AC device circuitry. For example, an array of blown fuse links (programmable read only memory, or PROM) can be used to encode the UID into the AC device so that the UID is absolutely unchangeable.

An inaccessible UID prevents hackers from copying and using the UID for illegitimate purposes. Also, the UID can be encrypted so that even if it is discovered on the AC device, a password or key is required to unlock it. A server or the discrimination software can have the key or password for unlocking the UID.

Also, hiding or encrypting the UID prevents the user from inadvertently providing the UID to unknown or undesirable people. Essentially, hiding or encrypting the UID can protect the user from himself. When the UID is hidden or encrypted, there is no way for any user to undermine the security provided by the UID.

Further, hiding or encrypting UIDs will prevent contacts (i.e. other people with the UID in a friendlist) from inadvertently providing the UID to unknown or undesirable people.

Alternatively, in optional embodiments, the UID can be viewable or modifiable by the server and/or the user.

Alternatively, UIDs can be provided with an expiration date. UIDs that have not been used for a period of time can be suspended or deleted for example.

UIDs can also be removed or deleted by a user if desired.

In another embodiment, the AC device scans (e.g. continuously scans) for nearby AC devices via the SR port and, optionally, notifies a user of available UIDs. These UIDs can be stored for later approval for transfer to the friendlist. For example, after starting the scanning mode, scanned UIDs can be stored in a "seenlist". The user can later approve certain UIDs (e.g. identified by name/picture so that the UIDs remain hidden) in the seenlist, and these will be transferred to the friendlist. For identification of the UIDs, the person names or nicknames can be presented and the actual UIDs (typically encrypted) are hidden from view. From the 'seenlist' the user can know who has an AC device. The user can send messages to people on the seenlist. In this case, because the UID is not yet in the friendlist, the server can forward such messages to the recipient's associated parental account for approval.

In another embodiment, the server provides a proxy connection for a user communicating over the Internet. In this case, a user's browser accesses the Internet through the server, and the server can filter Internet content according to requirements of the discrimination software. In other words, by providing a proxy connection, the server can remove (or quarantine) communications that do not meet the UID requirements of the discrimination software. Blogs, chat rooms, voice communications email etc that do not come from approved senders (or are not sent to approved recipients) in the friendlist are removed or quarantined by the proxy server. In this way, the local computer can rely on the proxy server for filtering Internet communication.

The discrimination software can be stand-alone software that monitors Internet communications, or it can be incorporated into existing software (e.g. as a plug-in) such as web browsers, email client software, voice over Internet protocol (VOIP) software, or the like. The discrimination can be incorporated into websites that facilitate communication between Internet users. Methods for providing software with this functionality are well known in the art.

In another embodiment, software is provided for limiting communication access to communication software that does not incorporate the discrimination software. For example, consider a child with access to an Internet-capable computer with two web browsers. A first web browser has the present discrimination software and friendlist enabled, and a second browser does not. In this case the second browser is a security risk for the child. To prevent such a security threat, software can be provided to warn when insecure software (i.e. communication software without the present discrimination software) is active on the computer. Also, for example, insecure communication software can be prevented from operating or accessing the Internet. Further, communications software can be provided with whitelists and blacklists (or Internet access to blacklists or whitelists) of safe and unsafe websites for a child to visit. The unsafe websites do not have the present discrimination software, and the safe websites do have the present discrimination software. Accordingly, a child or other computer user will be protected from unknown and unfamiliar people even when using a computer having unsecure communications software.

In another embodiment, the AC device can store and exchange messages, data or files via the SR port. These can be loaded onto the AC device from a computer, in a manner similar to a portable USB flash drive. This provides a way for exchanging data in person and/or for communicating using a computer lacking an Internet connection.

Also, it is noted that uploading the friendlists comprising the UIDs can be done via a secure, encrypted Internet connection, as known in the art. The "https" standard can be used for uploading the friendlists for example. Alternatively a VPN connection may be used between the computer and the server.

It is noted that the computers 38a 38b can be personal computers, laptop computers, cell phones, personal digital assistant devices (PDAs), gaming devices, or any other device capable of accessing the Internet or computer networks. For example, the present invention can be used to check email or IM messages with a cell phone or portable email device. As in the embodiments described above, the discrimination software can be located on the cell phone or portable device, or can be located on a remote server.

Figure 8:
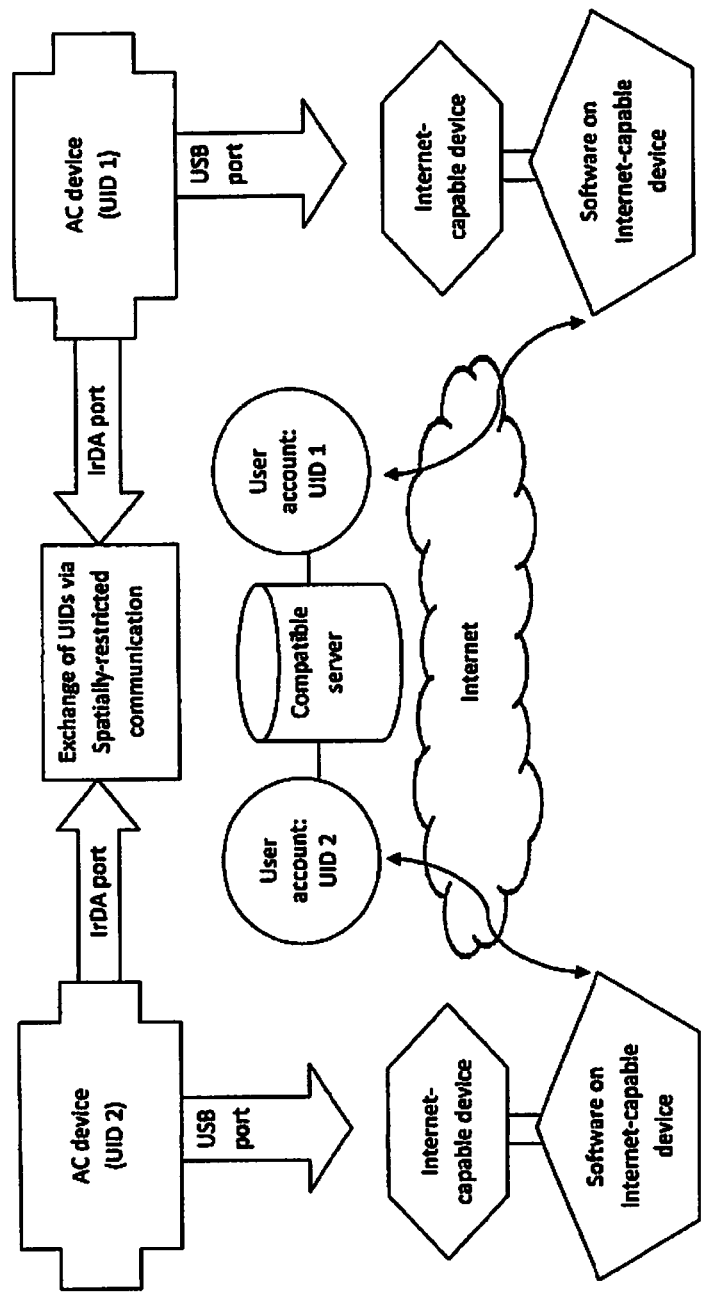
FIG. 8 shows a system according to an embodiment wherein a server governs communication through user accounts.

FIG. 8 shows a schematic diagram illustrating the system and method according to an embodiment of the present invention. In the diagram, the AC devices have infrared communications ports (IrDA ports) that provide spatially-restricted communication between the AC devices. The AC devices upload friendlists to an Internet-capable device via a USB port. The Internet capable device can be a computer, gaming console, cellular phone or the like. The Internet capable device uploads the friendlists to user accounts in a remotely located server via the Internet. The server has discrimination software for restricting incoming communications according to the contents of a user's uploaded friendlist.

Systems

As a skilled artisan readily will appreciate by review of specification that a variety of systems are contemplated to implement embodiments. FIGS. 9 to 18 illustrate some of these and are briefly introduced by their functional descriptions and specific implementation will be readily apparent to a skilled artisan.

Figure 9:
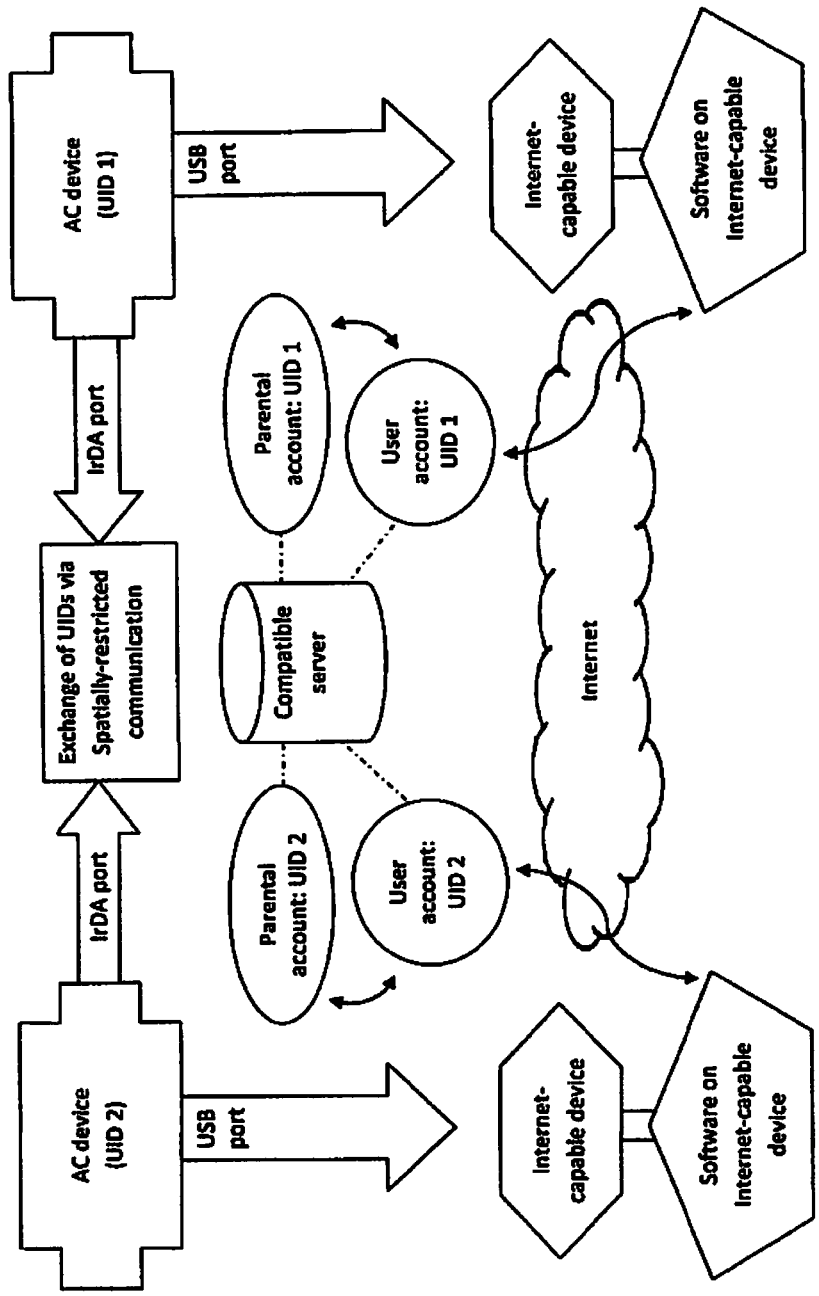
FIG. 9 shows a system according to an embodiment wherein a server governs communication through user accounts and parental (Authority) accounts.

FIG. 9 shows an embodiment in which parental accounts are provided. Parental accounts provide parent's access to a child's Internet communications. Also, the parental account can control settings and preferences for the associated child's account.

If an incoming communication does not have a UID, or has a UID that does not match a UID in the child's friendlist, then the communication can be routed to the parental account. The parent can determine the fate of the incoming communication (e.g. whether to delete, forward, or quarantine). Also the parent can decide to add or remove UIDs from the friendlist. In this way the parent can have complete control over communications and the contacts that the child can communicate with.

In a preferred embodiment, the server provides one or more conventional external addresses which is linked to an system-internal user account (corresponding to its UID). An example for such an external address would be a conventional email or instant messaging address. These external addresses may then be contacted like any other messaging address on the Internet. The server can accept messages directed to such an external address like any other messaging server. The server, however, will not indiscriminately allow incoming communication to reach the corresponding user account. Instead, the incoming communication will be processed by the discrimination software according to rules in the user account. If a rule regarding the contacting party's address exists in the user account, the server processes the communication accordingly. If no rule exists, the server generates a query to the authority (i.e. parent) through the corresponding parental account. This query can consist of the outside user's name and address, as well as the content of the message. The query can be a question within the parental account. It can also be directed to an outside messaging address specified by the Authority in the parental account.

Figure 10:
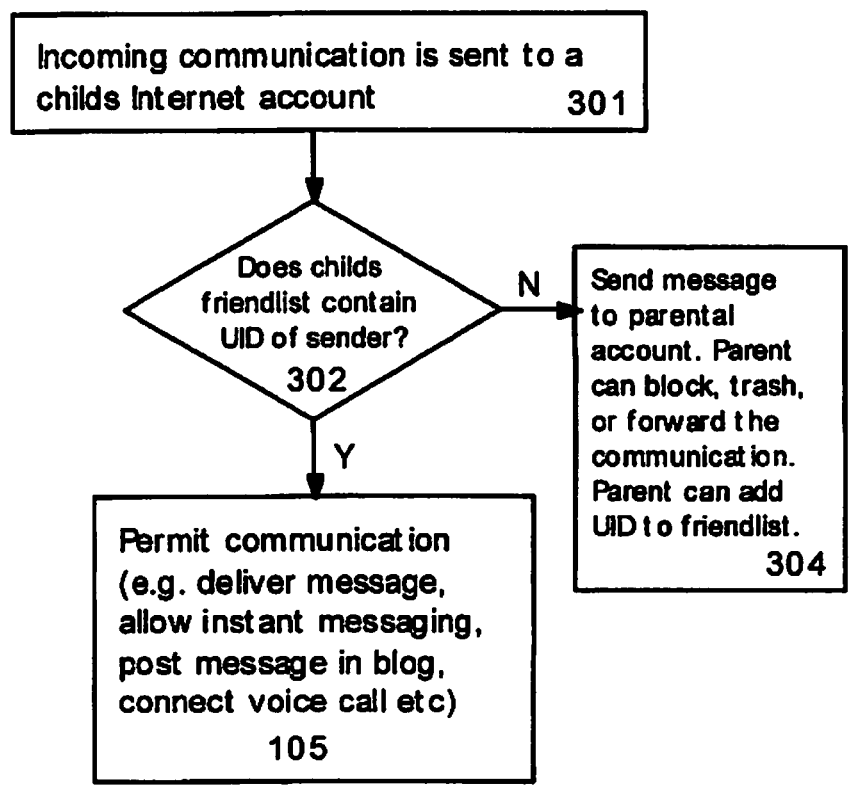
FIG. 10 shows a flowchart illustrating a method for parental monitoring of a child's Internet communications.
Figure 11:
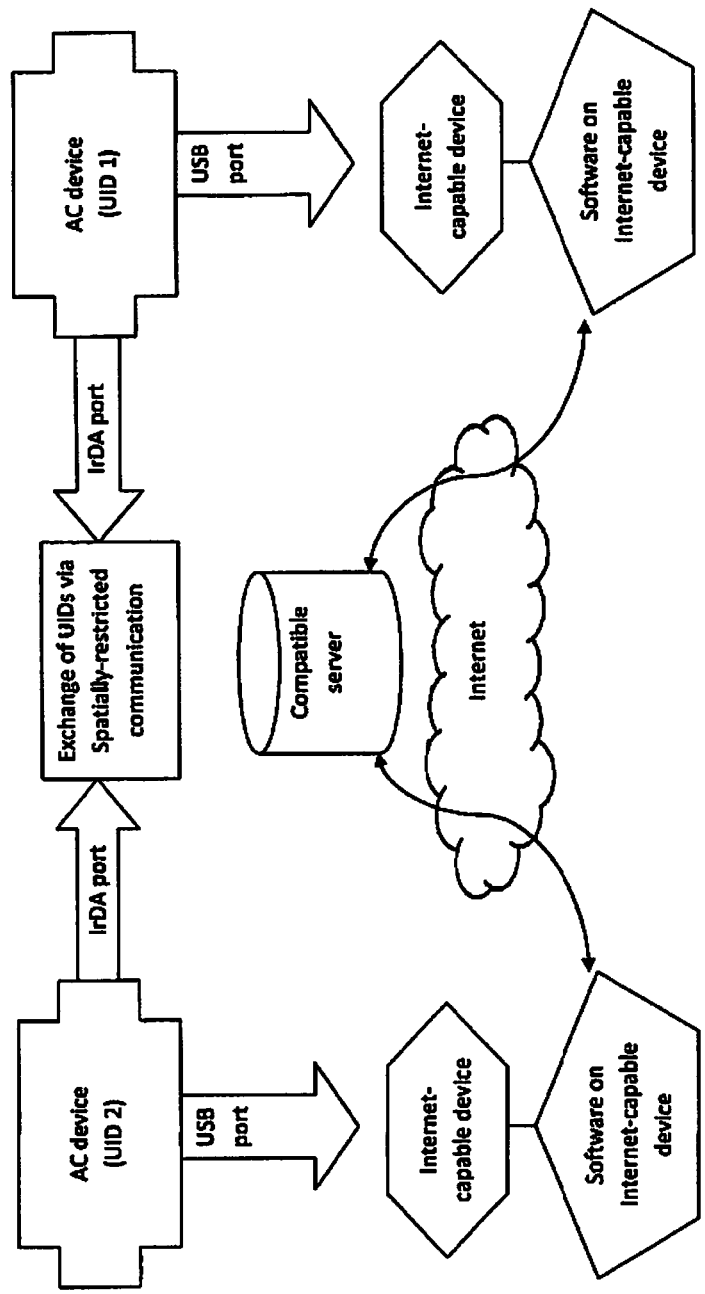
FIG. 11 shows how a server governs communication according to an embodiment.
Figure 12:
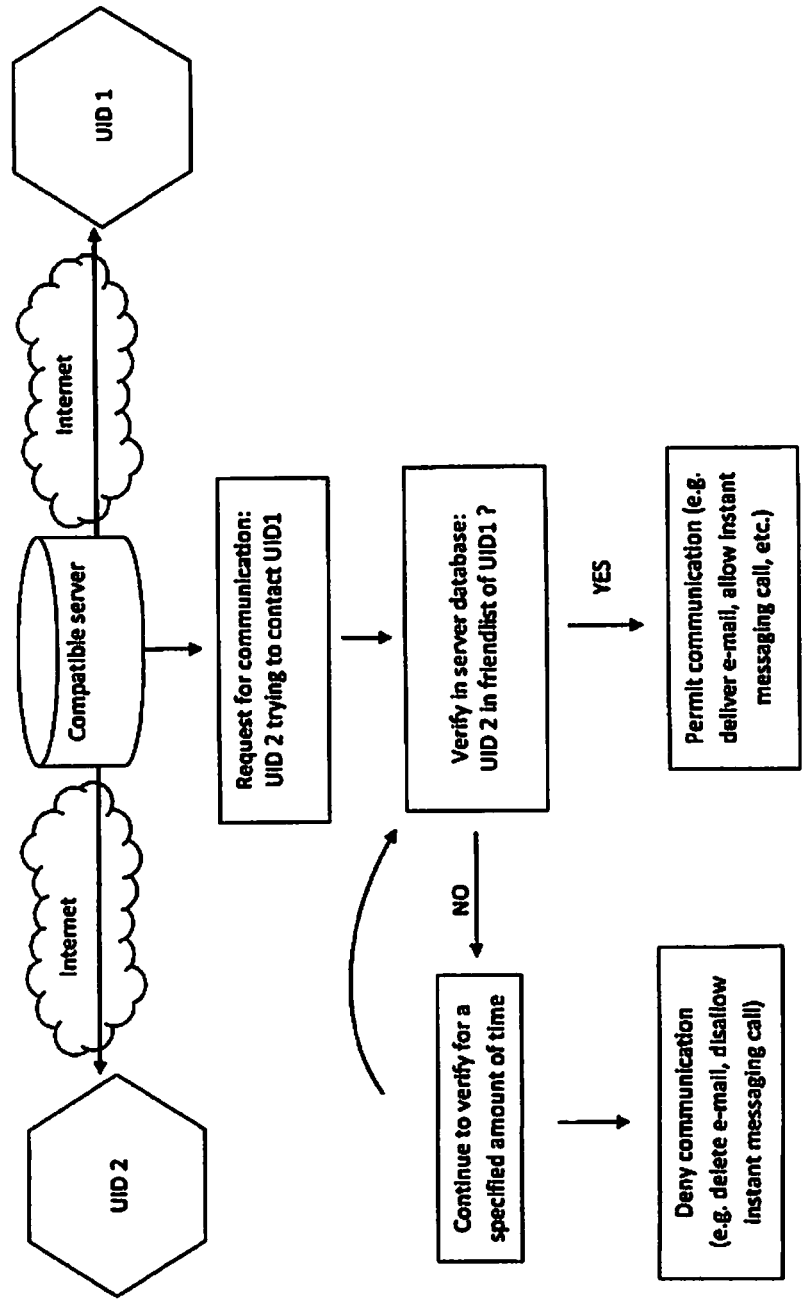
FIG. 12 shows a lower security version of a system wherein a server governs communications.
Figure 13:
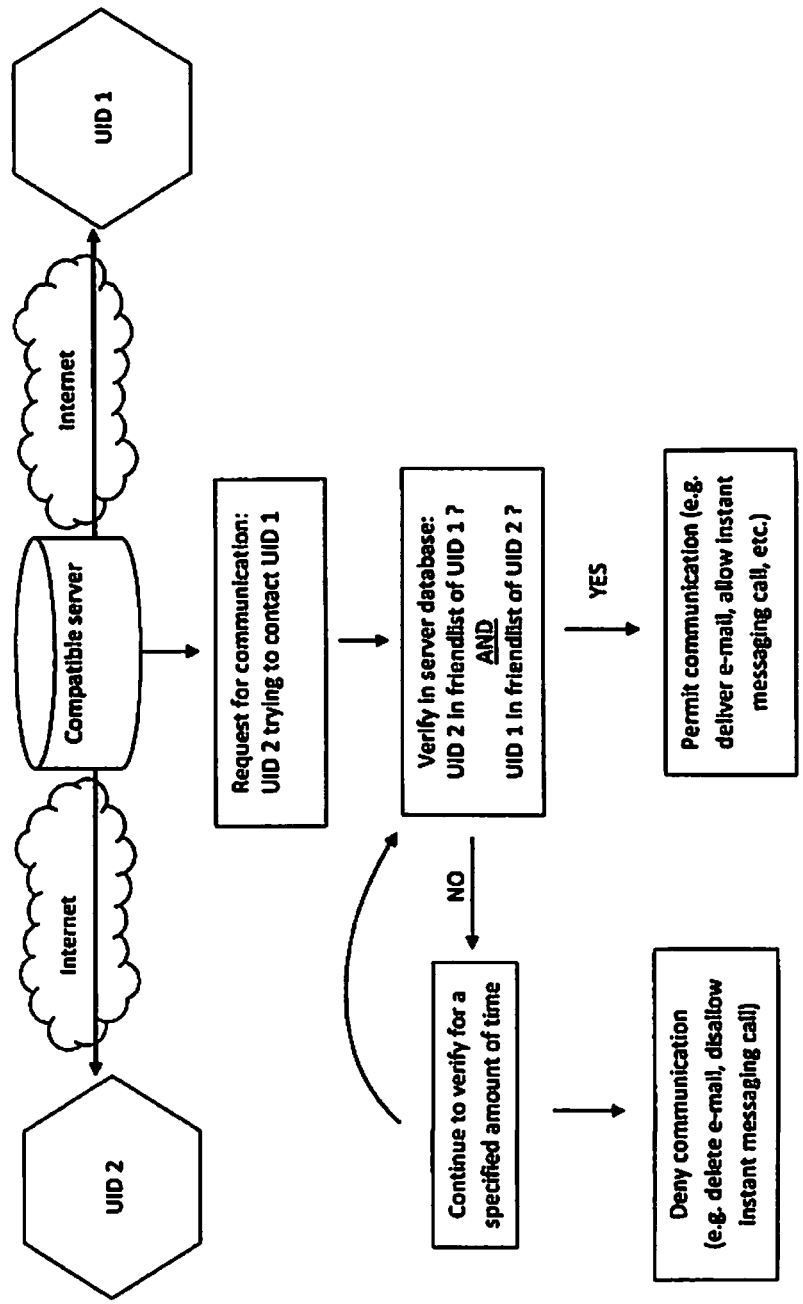
FIG. 13 shows a higher security version of a system wherein a server governs communications.
Figure 14:
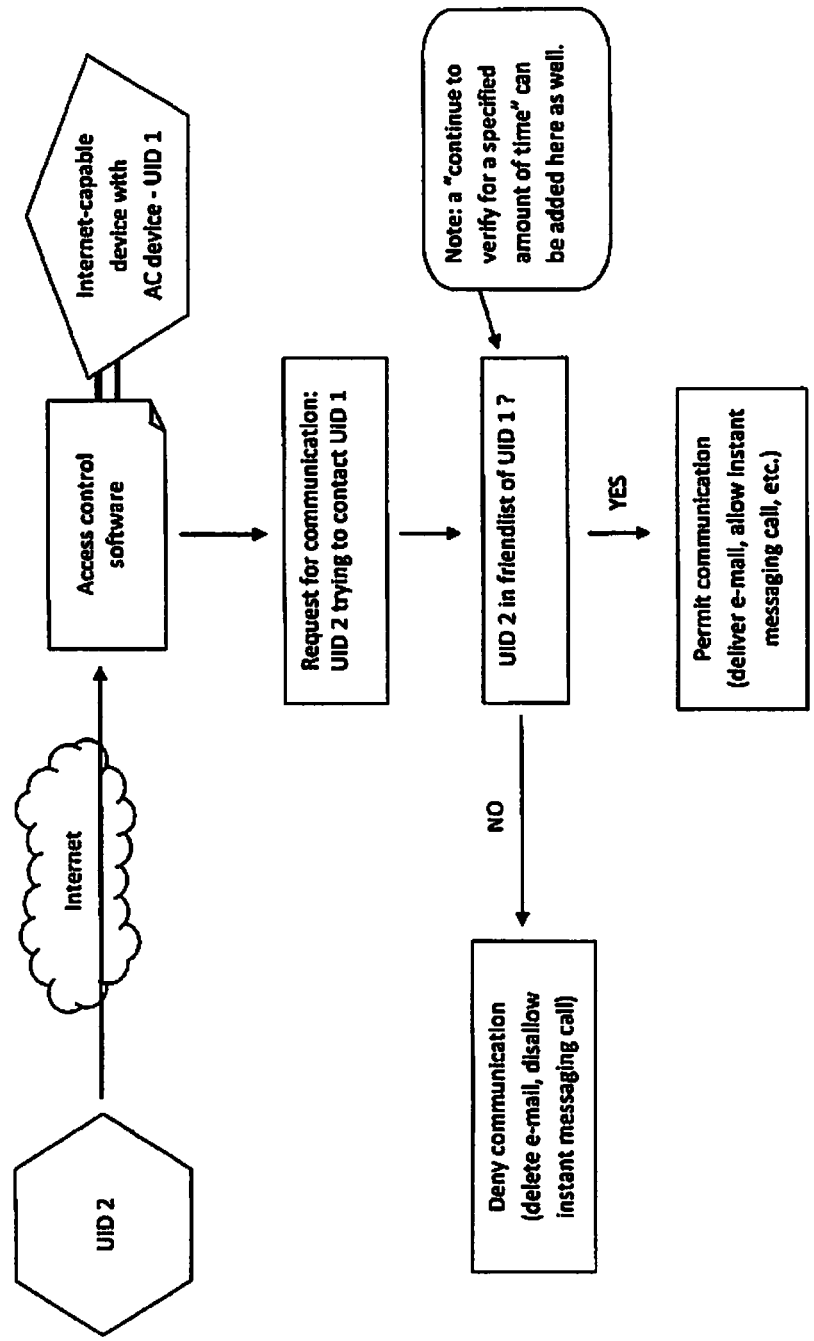
FIG. 14 shows software on Internet-capable device that governs communications.
Figure 15:
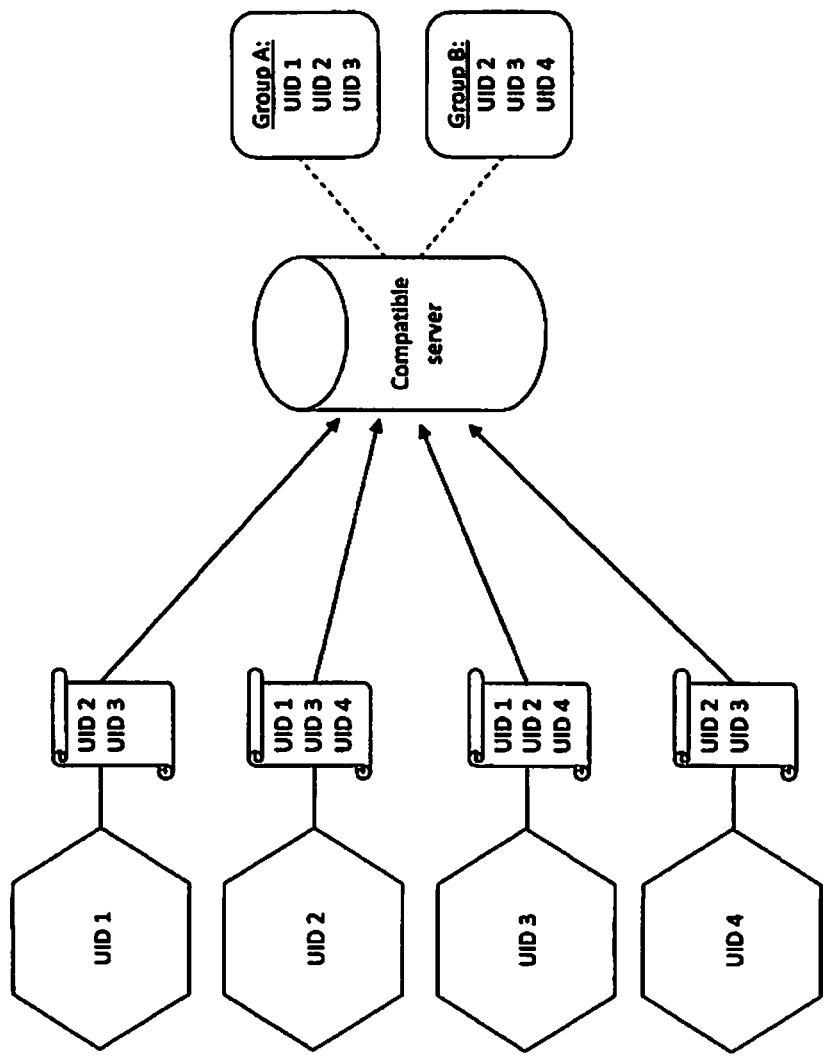
FIG. 15 shows a server that dynamically forms groups in order to provide group activities such as message boards and multi-user chat rooms.

FIG. 10 shows a flowchart illustrating a method for parental monitoring of a child's Internet communications. FIG. 11 shows how a server governs communication according to an embodiment. Here, the server responds according to the presence of UIDs in friendlists. FIG. 12 shows a lower security version of a system wherein a server governs communications. The compatible server carries out a basic algorithm as described. FIG. 13 shows a higher security version of a system wherein a server governs communications. The compatible server carries out a basic algorithm as described. FIG. 14 shows software on Internet-capable device that governs communications. The device carries out the described algorithm. FIG. 15 shows a server that dynamically forms groups in order to provide group activities such as message boards and multi-user chat rooms.

Figure 16:
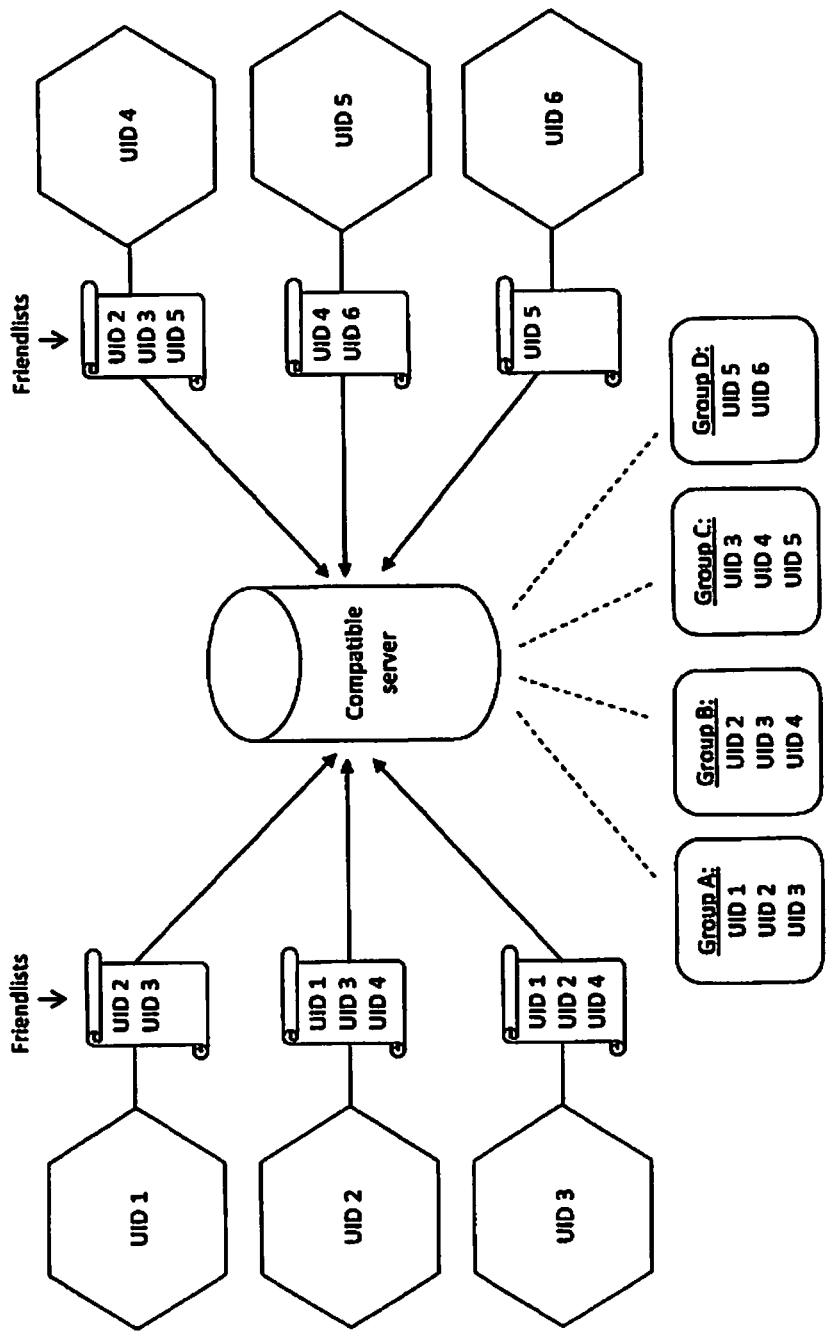
FIG. 16 shows a server that dynamically forms groups in order to provide group activities such as message boards and multi-user chat rooms.
Figure 17:
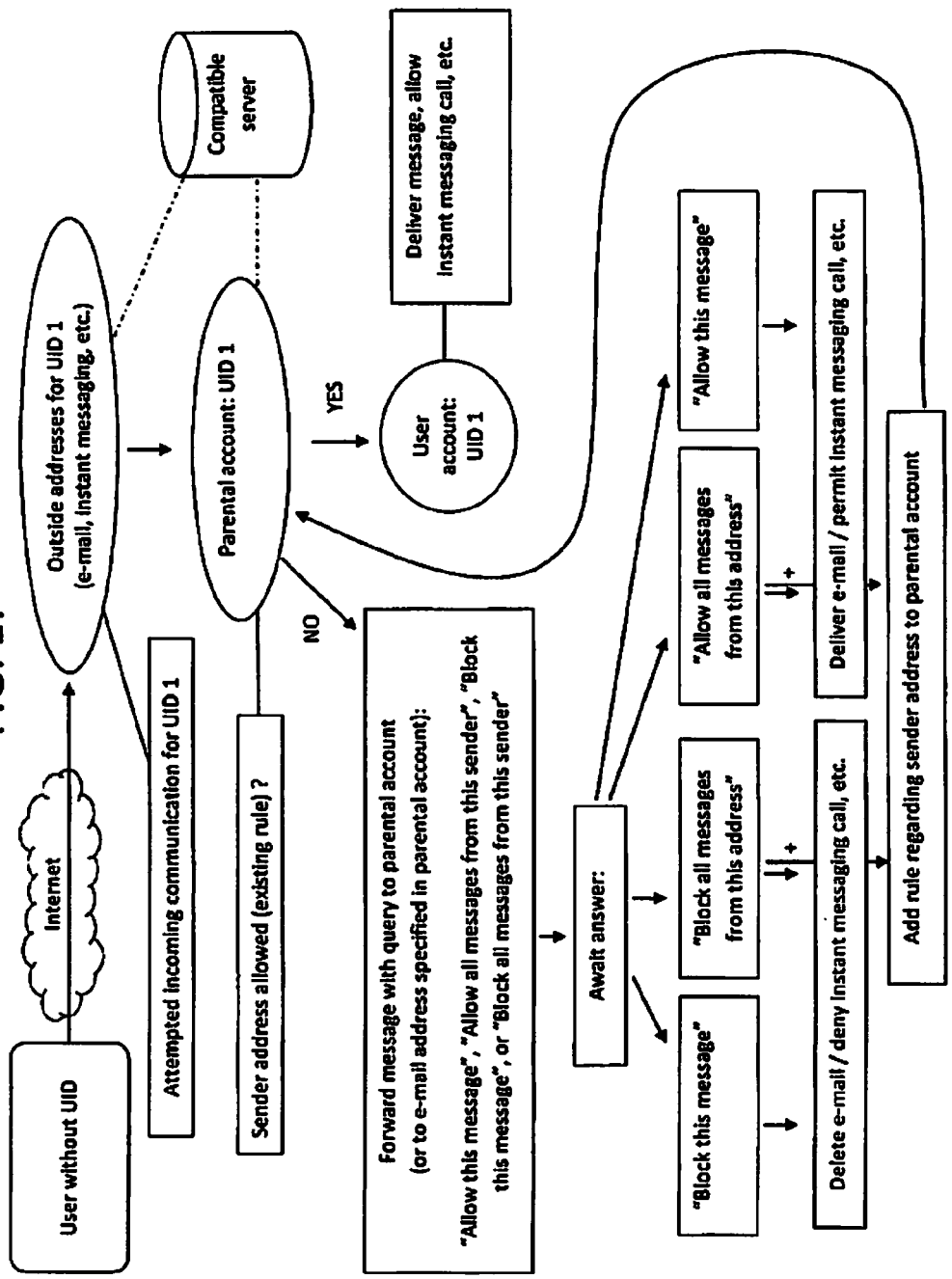
FIG. 17 shows a server governing messaging from outside addresses that lack UIDs according to settings made through a parental account as an Authority.
Figure 18:
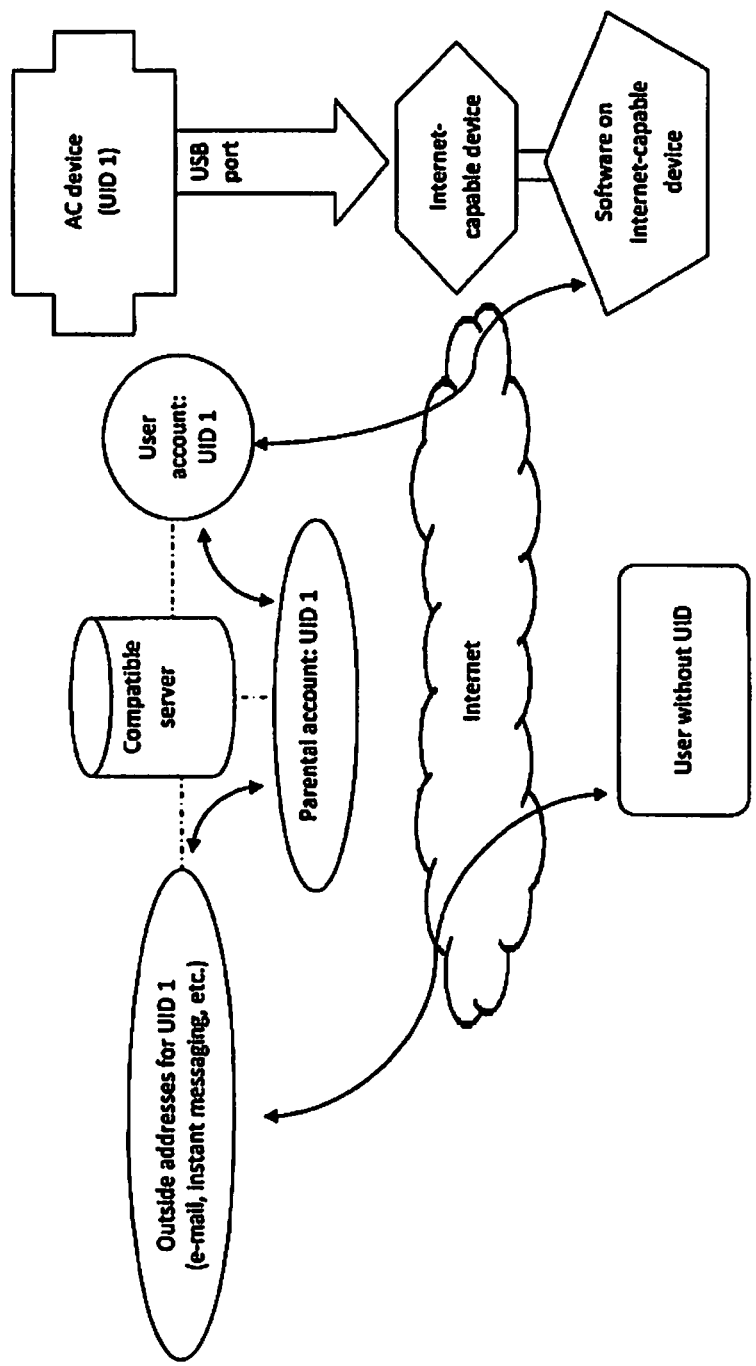
FIG. 18 shows a procedure for handling incoming messages from an outside address that lacks a UID.

FIG. 16 shows a server that dynamically forms groups in order to provide group activities such as message boards and multi-user chat rooms. FIG. 17 shows a server governing messaging from outside addresses that lack UIDs according to settings made through a parental account as an Authority. In this embodiment, the server governs communications without IUDs in accordance to optional settings made through corresponding parental accounts. FIG. 18 shows exemplary procedures for handling incoming messages from an outside address that lacks a UID.

Methods for controlling and/or limiting electronic contacts were found whereby a first electronic device with a first unique identifier, hereinafter called "UID", is brought into physical proximity with a second electronic device having a second UID. At least the first UID is transferred from the first device to the second device. This allows subsequent flow of electronic data via a wide area network such as the Internet between users of devices whose UIDs have been exchanged.

Preferably, "flow of electronic data" includes any electronic media data such as text, images, audio, video, and three dimensional simulations, transferred through synchronous and/or asynchronous methods. According to an embodiment, the distance between the first and the second device is 10 meters at a maximum. Preferably, the first UID is transferred upon physical or near-physical contact between the first device and the second device. Preferably the second UID also is transferred from the second device to the first device. In general, more than two inventive devices can exchange their UIDs.

These and other contemplated methods can be implemented by discovered devices for controlling and/or limiting electronic communication, whereby possession and access to a UID is potentiated by exchange of UID with a second device having a second UID. According to an embodiment, the first device is 99 associated with a first person or group and, preferably independently thereof, and the second device is associated with a second person or group. This arrangement allows online communication between the first person or group and the second person or group after exchange of UIDs between the first and the second device, preferably through a physical, or near-physical, connection. This exchange can limit online communication to users whose UIDs have been exchanged through a physical, or near-physical, connection.

A substantial advantage of an embodiment is the limitation of online contacts to users whose devices have been brought close enough to be able to exchange their UIDs. Optionally, a controlling party, or Authority can limit a user's contacts to people with whom the user has close personal contact, close enough that a physical, or near-physical, connection between the corresponding devices may occur. The Authority, who may be a parent of a user, an employer of an employee user, or a government agency that controls electronic communication of its citizens, may make exceptions to the restrictions based on lists, or other arbitrary considerations.

Embodiments may be employed by parents or schools, for example, that can ensure that children are able to communicate electronically (e-mail, instant messaging . . . ) exclusively with persons encountered in normal everyday life. Typically this would include schoolmates, friends and family members. The risks of children meeting and communicating with pedophile adults who might be posing as a fellow child in online forums, for example, therefore are alleviated. A user device has, or has access to, a UID and is, in general, equipped with, or has access to, storage memory in which it is able to store the UIDs of other devices. Preferably, the storage memory is non-volatile and of solid-state type. In an embodiment, a "contact" refers to physical proximity between two users. Preferably, user devices are brought into physical, or near-physical, contact with each other.

In an embodiment, a inventive device is a unitary battery powered portable device comprising: non-volatile solid-state memory capable of storing at least UIDs; an IrDA infrared port and interface capable of exchanging at least UIDs with other inventive devices via the IrDA protocol; a universal serial bus (USB) plug and interface capable of coupling the inventive device to a USB socket of a computer via the USB protocol; a memory control device coupled between the interfaces and the memory; a mechanism activating the exchange of at least UIDs between two inventive devices. In a further embodiment, a single coupling device may provide both coupling functions, namely with other devices as well as with an Internet-capable device. Generally, when two inventive devices are connected to each other, each device sends its UID to the other and stores the other's UID into the memory storage it has, or has access to.

A device, when connected to another, Internet-capable device, can provide to the Internet-capable device stored UIDs. The Internet-capable device then may provide the UIDs to a compatible server which, in turn, is able to provide or permit electronic communication (e.g. e-mail, instant messaging . . . ) between users whose inventive devices have exchanged their UIDs. In a preferred embodiment, the UID serves only this purpose, and merely exchanges information between the inventive device, an Internet-capable device and a compatible server. Preferably, the UID is not intended to be viewable or modifiable by a user.

Typically, an Internet-capable device requires software to use UIDs provided by the inventive device. This software can be specific to a purpose of an embodiment. The software also can be an adapted version of existing software such as, for example, an e-mail or instant messaging client. The software required to make use of the UIDs can be made available to the Internet-capable device in a variety of ways. In one such example, the software requires an initial installation on the Internet-capable device's permanent storage device. In another embodiment, the software is portable and does not require formal installation onto the Internet-capable device's permanent storage device. The software may be delivered through the storage memory of the inventive device, on a portable medium such as an installation CD, or through a so-called web application, accessible through a standard Internet browser and provided by a compatible server.

In an embodiment, the inventive device provides to the Internet-capable device, software and/or settings for limiting Internet access in such a way that Internet-based communication occurs only between users whose UIDs have been exchanged. In another embodiment, the inventive device provides to the Internet-capable device software and/or settings for filtering the user's Internet web page access according to whitelists and blacklists.

In a preferred embodiment, the inventive device provides to the Internet-capable device software and/or settings for limiting Internet access to programs that protects children online. This includes programs that are able to make use of the UIDs for Internet-based communications and/or able to filter web pages according to whitelists and blacklists. This potentiates, in a relatively uncomplicated and convenient way, a controlled and secure opening on an Internet-capable device which otherwise is blocked from standard open Internet access. This can be attained, for example, through a firewall that denies Internet access to all programs that do not conform to the scope of the invention. It can also be attained through adapted versions of existing content control programs, or in conjunction with computer operating systems that provide built-in parental control mechanisms (e.g. Windows Vista, Mac OS X).

In a preferable embodiment, the inventive device can transfer personal information (text, images, sounds, music, videos . . . ) that has been stored in the memory of the device directly from inventive device to inventive device via close range, physical or near-physical connection. This allows the exchange of information in person and without necessitating an Internet connection. For example, children can exchange personal information that has accumulated on a computer without the need for a connection to the Internet.

In addition to the described limiting and/or controlling functions, a further advantage of an inventive device is simplification of initiating online communication, especially for children. The usual requirements of setting up an e-mail or instant messaging account, for example, as well as the error-prone process of communicating verbally or in writing what are often cryptic personal addresses with others can be avoided. Additionally, the inventive device can be targeted towards specific groups of users, such as children, and can be bundled with software geared towards those users.

Another advantage is provision of desirable functions while maintaining user independence from individual Internet-capable devices. For example, in an embodiment, a child can use a device to communicate with contacts and to browse safely with a computer at home, on a parent's machine at work as well as from an Internet cafe. Another advantage is the circumvention of unsolicited messages such as spam. This is particularly helpful when much of spam contains pornographic or other adult-oriented material.

A compatible server according to embodiments can be programmed to meet various degrees of security. In a preferred embodiment, the compatible server is programmed to permit communication only between users whose exchanged UIDs have been received by the server from both the sender's as well as the addressee's inventive devices. This can prevent a hacker, for example, with access to UIDs from being able to send messages to users with UIDs, since the sender's UID would not have been received from the addressees' devices.

To simplify the process of sending messages, a compatible server generally will accept sent messages but will delay their delivery until receipt of the sender's UID by the addressee's device. Messages can be stored for a certain amount of time after which the server can delete the message and/or inform the sender of an undeliverable status.

In another preferred embodiment, the compatible server provides communication between more than two users on the basis of previously exchanged UIDs. Possible examples of this are synchronous chat rooms or asynchronous discussion forums. Rather than allowing users to meet strangers, the server will provide individual online meeting areas by dynamically creating groups of users whose UIDs have previously been exchanged in person. Optionally, the compatible server can create groups according to a variable degree of strictness where, for example, a friend of a friend may be included in a group. To maintain a minimum level of user safety in such a case, the server could, for example, allow only group-based communication between users whose UID's have not been directly exchanged, where the only possible communication between those users would be open and visible to all members in the corresponding group. This would ensure that a common friend could witness the communication between those users who have not exchanged UIDs in person.

In a preferred embodiment, a compatible server provides a user account corresponding to the UID of a user device. This user account stores UIDs collected by the device. In addition, the user account can store data such as text, images, sounds and videos, for example. This user data can be data that the user has generated or compiled as well as data from other users with whom the user has communicated, received through Internet-based communication and/or direct device to device transfers. Furthermore, the user account can provide the user with distinguishable personal and public folders, the latter of which can serve to share personal data with other users. Various public levels are also possible. One public folder level, for example, could result in data being accessible by users who are in the user's friendlist. Another might be viewable by users with UIDs who are not in the friendlist. Yet another level could be viewable by anyone on the Internet. The corresponding parental account can offer individual preferences in this regard as well.

In another preferred embodiment, the compatible server provides a parental or supervising account for use by a supervising party ("Authority"). This parental account provides access to individual settings and rules that govern the corresponding user's allowed online behavior. For example, through the help of the parental account a parent, school or other controlling party can make individual decisions regarding what the corresponding user is allowed to access online, with whom and with what methods the user can communicate (e-mail, instant messaging for text only, instant messaging with audio or video). Generally, more than one user account may be assigned a parental account, such as for a school, club or families with several users.

An authority, such as a parent, government agency, or employer-owner of a user computer, can allow the user to communicate with persons that lack an inventive device. In accordance with optional settings made within the parental account, the compatible server can provide incoming and outgoing communication (e.g. e-mail, instant messaging) between the user and persons on outside systems that do not comply with restrictive features and access requirements. For this, the compatible server can provide to the user account one or more outside addresses, such as an e-mail or instant messaging address, for which the server will accept incoming and/or outgoing messages. Rather than delivering the messages, however, the server will first verify if a corresponding rule exists for the message in the corresponding parental account. If no rule for allowing or denying the message exists in the parental account, the server can generate a query to the controlling party within the parental account or to an outside address specified in the parental account. The controlling party could thus allow or deny the message as well as any future messages from and/or to the outside address.

In another preferred embodiment, the compatible server can limit the validity of exchanged UID according to a variable length of time. For example, the server could require that users renew the exchange of UIDs (within set time periods, for example) for certain types or levels of communication to remain available between them. The parental account could offer the controlling party individual preferences in this regard.

An authority account can be provided and accessed through the help of a parental kit. This parental kit could, for example, be made available with the inventive device and can be labeled in a way to declare its purpose, namely that its use is reserved for a controlling party such as a parent. Additionally, an activation procedure can be required to prevent misuse. Such an activation method could, for example, require the entry of a valid credit card or social security number on the web page of the compatible server. The parental kit may, for example, be setup and accessed through an Internet connection to the server from a standard browser. The parental kit may also be delivered in the form of an installation CD or in the memory of the AC device containing software and/or information for setting up and accessing the parental account.

Furthermore, the parental kit may also be delivered in the form of a separate parental access device (PAD) which can be linked to the corresponding AC device by having a corresponding UID. It would also be advantageous to bundle AC devices with PAD devices so that a parent could get immediate control over the corresponding parental account.

The above mentioned complexities and other limitations in this field are alleviated by a small, handy device that does not require extensive monitoring or set-up by a user. In a preferred embodiment, safe, restricted communication is achieved without the need to supply an internet terminal. In a most preferred embodiment, a battery powered USB memory stick, small enough to fit in a hand (or worn on a keychain), is provided that gathers contacts in-person and connects to any remote terminal, such as a computer, which connects to a compatible server to provide safe communication between "known" users.

In an embodiment, an in-person UID exchange is made enjoyable by the use of sound such as a jingle bell, and recognizable sound such as a train noise, flashing lights, vibration, or other signal to indicate a successful UID exchange. In another embodiment, the establishment of a successful exchange is reported to a Supervisor by, for example, adding personal information associated with the outside UID to a list that may be read and modified by a supervisor. The UID information could be uploaded to a server at some point to accommodate this optional reporting.

In another embodiment, additional functionality is provided to enhance the user experience with the inventive system. This can include features such as "fading friendships" and/or "refreshing friendships" where users who have previously exchanged UIDs need to exchange UIDs again within certain intervals of time (e.g., every two weeks, for example) to prevent their friendship from "fading", which may be visualized by displaying fading profile information, or fading photos or pictures in the corresponding user's online account, for example. Furthermore, users could be allowed to create "closer" ties with certain friends by repeatedly exchanging their UIDs. Also, users could be given the way to designate or rate certain friends as being particularly close or dear (e.g., on a scale of 1 to 10, for example). Such a rating could be entered by users on their AC device (in which case the AC device would make the information available to the server), or directly within the user's corresponding online account.

In another embodiment, the AC device is equipped with only one communications port, both for communicating UIDs with other AC devices, and for communicating with an Internet-capable device. This port can be a line of sight optical port, a short-range wireless port, or a hardware connection, or an audio port, for example. In this case, two AC devices would exchange UIDs via the same port that is used to make the UIDs available to the server, via an Internet-capable device such as a computer, for example. For example, an infrared port may serve to exchange the UIDs with other AC devices, while the same infrared port may be used to connect to a computer. In the event that the computer to be used is not equipped with a corresponding coupling device (in the given example, an infrared port), an adapter may be used. Such an adapter may be supplied together with the AC device. Such an adapter may also be obtained separately. Furthermore, a third party adapter may also be used. For example, a standard USB-infrared adapter (IrDA compatible or other) may be used between an AC device that is equipped with only an infrared port.

In an embodiment, the user account may be accessed by the user independently of the AC device. For example, a user's AC device serves to exchange UIDs with other users' AC devices and to make the UIDs available to the server. The server in turn stores the UIDs and links them to the AC device user's user account. If the user accesses his user account without the AC device, he/she can communicate with those users with whom he/she has exchanged UIDs with. This is of particular significance if a user's AC device is a cellular telephone. Such a user's AC device may upload any exchanged UIDs to the server directly via a cellular data connection (e.g., GSM, 3G, etc.), for example. Such an AC device may also upload the UIDs to the server via any other available connection, whether direct or via an intermediary device or connection. For example, the cell phone may make the UIDs available to the server via another Internet-capable device via Bluetooth, W-LAN, NFC, or any other type of connection. As long as the server stores the UIDs in the user's user account, the user may have access to the uploaded UIDs' corresponding users, even if he/she accesses his user account (e.g., via URL, screen name, and password) independently of his AC device. In this embodiment, a user can use his cell-phone-based AC device to exchange UIDs with others, while not requiring his cell-phone-based AC device to supply or assist in accessing his/her user account.

In an embodiment, a cell-phone-based AC device may also exchange UIDs with non-cell-phone-based AC devices. For example, a cell-phone-based AC device may exchange UIDs with AC devices lacking cell-phone functionality. So long as both AC devices possess compatible ports to be able to exchange the UIDs over, they may be used to exchange UIDs within the scope of the invention.

In a preferred embodiment, the AC device stores in its internal storage memory a portable browser. This browser can, for example, be a portable version of Mozilla Firefox, or Google's Chrome. The portable browser may contain predefined settings as well as a fixed start page to transport the user onto a specific site or portal automatically. The portable browser may also contain the user's screen name or user name, which is typically used for accessing an online user account. This means that the AC device can facilitate the user's access to his/her online user account. Optionally, the portable browser may also store the user's individual password, although this may represent too great a risk of undesirable access to the user's online account (and their online friends) by unauthorized individuals, such as in the event of a lost or stolen AC device. It may therefore be advantageous to require the user to enter a password to access his/her online account. In order to reduce the effort required by the user, a visual password (e.g., clicking on certain pictures in a certain order, for example) may be used instead of a standard typed password. A personal identification code or biometric recognition system (either on the AC device itself, or separately connected to the computer) could also serve to authenticate the user in order to access to his/her online user account. The AC device may contain hardware and/or software to enable the portable browser to be automatically launched on the computer upon connection (e.g., via USB). In general, the portable browser may be configured in such a way that it directs all webpage requests through a content-filtering web proxy. This way, when the user requests any Internet address (URL), the browser requests that address via proxy server. The proxy server then handles filtering the URL and/or the content of the corresponding webpage in regard to safety or appropriateness for the user. In addition, software may be launched and/or triggered in order to influence any other software that may be accessible on the computer. For example, supplied firewall software may be launched or triggered to block normal Internet access by any other Internet browser or program that may be available on the computer. Alternatively, instead of denying Internet access to such programs, requests for Internet addresses could also be routed through a proxy server by the said firewall software. The advantage of this would be that the user of an AC device could be protected from contact with inappropriate content and undesirable Internet users even if he/she opens software other than any supplied software. Such firewall software could be programmed to be either active only while the AC device is connected to the computer, or it could be programmed to remain active on the computer even after the AC device is disconnected from the computer. The latter would be of particular value when the AC device is to be used on a computer owned by the user to be protected (e.g., a child's own computer). It would also be possible, however, that such software could trigger mechanisms that may already be available on the computer, such as the operating system's user accounts with varying user rights, or existing parental control systems such as those available in Windows Vista, Windows 7, Mac OS X, or other operating systems. For example, it may be possible to let the AC device's connection to a computer (e.g., via USB) trigger a certain computer-user-account (vs. online user account) with limited user rights. The device could then help the user to log into his/her computer's user account upon connection and even return the computer to the typical log-in screen upon being disconnected. This way, a child could easily access (without first having to select its user name and without having to type in a password) its own computer-user-account on a family computer without having access to any other user's rights on that computer, for example.

The term, "portable browser" refers to an Internet browser that functions as a so-called portable application, a computer software program that does not need to be installed or copied onto a computer's mass storage device to be executed, running instead from a removable storage device such as a USB flash drive, CD-ROM drive, flash card, or floppy disk.

Aside from assisting the user to log into his online user account in the above mentioned way, the portable browser may automatically upload to the server any UIDs that are stored on the AC device (UIDs that have been exchanged with other AC devices). This may, for example, be accomplished through a special browser plug-in that accesses the UIDs from the AC device's internal storage memory. It may also, for example, be accomplished by the AC device having stored the UID information in a specific folder and/or specific file for use by the portable browser. For example, the UID information could be stored in a special cookie file within the portable browser's corresponding folder. An advantage of this could be that no special software would be required (e.g., plug-in).

The server uses the UIDs to associate or link user accounts according to the UIDs that have been exchanged via AC devices (in person). Accordingly, the server can make user profiles accessible (i.e., visible) between users who have exchanged UIDs. The user profiles could therefore remain hidden to the rest of the Internet, thereby protecting the user's identity as well as protecting the user from unsolicited communication. User profiles typically make up a kind of webpage that is commonly used on social networking sites, for example, and they may contain personal as well as non-personal information, including names, addresses, phone numbers, school names, lists of favorites (e.g., colors, pets, music, movies, etc.), as well as user photos, pictures and videos, for example. Such profile information may also include fictional names and characters such as nicknames and two or three dimensional avatars, for example.

The server can provide real-time and/or non-real-time communication between users whose UIDs have been exchanged. This can include e-mail, instant messaging (IM), chat, texting, VoIP, video conferencing, or file sharing, for example. The server may also provide online games to be played between users whose UIDs have been exchanged. The server may also generate groups consisting of users who have all exchanged UIDs between one another. This may result in groups or online communities where every user knows every other user from in person meeting (having exchanged UIDs in person). Such groups may then be used for group discussions, collective projects, multi-player games, for example. The server may also allow users to see which users still need to exchange UIDs in order for someone to join a certain group. For privacy reasons, it would be possible to display nicknames representing the users who have not exchanged UIDs, rather than displaying the users' real names. The server may also allow users to assign names, photos, or logos to their groups. Furthermore, the server may allow users to communicate only with those users with whom UIDs have been exchanged.

In addition or in place of providing the above mentioned communication functionality, the server may also allow users to explore and use online services provided by a third party. Various current or future standards, including application programming interfaces such as OpenSocial, may allow a compatible server to provide communication functionality in accordance to the present invention. The server managing the UIDs may thereby make all or part of his user account information available to third party online services, such as social networking sites. This means that users of the AC device would be able to explore different sites (e.g., MySpace.com, Yahoo.com, Webkinz.com, etc.) while remaining protected from contact with strangers according to the invention. In such a case, the server managing the UIDs could act more in the background, leaving users the choice as to where they wish to communicate with their friends. Combined with the safe surfing functionality attained through a content-filtering web proxy, for example, the described system represents a comprehensive stand-alone solution for protecting users such as children on the increasingly interactive Internet.

In another embodiment, a subsidized AC device is sold or given to users at low or no cost. In such a case, the server may verify the user's current Internet Service Provider (ISP) and match it against the name of the subsidizing company. Accordingly, the server may allow or disallow certain or all functionality, depending on whether the user is connected to the subsidizing company's predefined ISP. This may allow the AC device to be distributed more easily and it may help to reach a larger user base more quickly (i.e., critical market mass).

It will be clear to a skilled artisan that the described embodiments may be altered in many ways without departing from the scope of the invention as claimed.

Accordingly, the scope of the invention should be determined by the following claims and their equivalents.

The invention claimed is:

1. A social networking system, comprising:
a server system comprising at least one server and configured to host accounts for a protected class of people, the server system also being configured to provide communication between accounts according to at least a first security degree and a second security degree, the first security degree providing higher security than the second security degree, wherein
a first user of a first account of the protected class defaults to first security degree communication with a user of a second account in the absence of electronically verified indicia of physical contact between the user of the first account and the user of the second account, and
second security degree communication between the user of the first account and the user of the second account is allowed given the electronically verified indicia of physical contact.

2. The social networking system of claim 1, wherein
the second security degree communication allows the user of the second account to access a personal profile of the user of the first account, whereas
the first security degree communication does not allow the user of the second account to access the personal profile of the user of the first account.

3. The social networking system of claim 1, wherein the communication allows the user of the second account to identify online the user of the first account, whereas the first security degree communication does not.

4. The social networking system of claim 1, wherein the first security degree communication means that the user of the first account and the user of the second account are not present in each other's friendlist, and the second security degree communication means that the user of the first account and the user of the second account are present in each other's friendlist.

5. The social networking system of claim 1, wherein the first security degree communication does not allow messages between the user of the first account and the user of the second account, and the second security degree communication allows messages between the user of the first account and the used of the second account.

6. The social networking system of claim 1, further comprising a plurality of hand-held access control (AC) devices each containing memory and a unique identifier (UID) associated with a respective user of a protected class account and configured to exchange UID information with other AC devices to thereby provide the indicia of physical contact.

7. The social networking system of claim 6, wherein each AC device includes one or more communication ports configured to exchange UIDs via at least one of short-range optical, infrared or electromagnetic communications, or via a hardware connector.

8. The social networking system of claim 7, wherein each AC device is configured to exchange UIDs based on a manual input of the respective user.

9. The social networking system of claim 8, wherein the manual input is the entry of a personal identification code.

10. The social networking system of claim 6, wherein the AC device is a mobile phone.

11. The method of claim 6, wherein the AC device is a mobile phone.

12. The social networking system of claim 1, wherein the protected class is based on at least an age of minority.

13. The social networking system of claim 12, wherein the server system is further configured to regulate access to a protected account based on one or more secondary indicia.

14. A method for social networking that employs a server system comprising at least one server and configured to host accounts for a protected class of people, the server system also being configured to provide communication between accounts according to at least a first security degree and a second security degree, the first security degree providing higher security than the second security degree, the method comprising:
using the server system,
for a user of a first account of the protected class, defaulting to first security degree communication with a user of a second account in the absence of electronically verified indicia of physical contact between the user of the first account and the user of the second account, and
for the first account, allowing second security degree communication between the user of the first account and the user of the second account given the electronically verified indicia of physical contact.

15. The method claim 14, wherein the second security degree communication allows the user of the second account to access a personal profile of the user of the first account whereas the first security degree communication does not allow the user of the second account to access the personal profile of the user of the first account.

16. The method of claim 14, wherein the second security degree communication allows the user of the second account to identify online the user of the first account, whereas the first security degree communication does not.

17. The method of claim 14, wherein the second security degree communication allows the user of the first account to play a game with the user of the second account, wherein the first security degree communication does not.

18. The method of claim 14, wherein the protected class is based on at least an age of minority.

19. The method of claim 18, wherein the server system is further configured to regulate access to a protected account based on one or more secondary indicia.

20. The method of claim 18, further comprising the server system accepting electronically verified indicia of physical contact from a plurality of hand-held access control (AC) devices each containing memory and a unique identifier (UID) associated with a respective user of a protected class account and configured to exchange UID information with other AC devices to thereby provide the indicia of physical contact, wherein each AC device includes one or more communication ports configured to exchange UIDs via at least one of short-range optical, infrared or electromagnetic communications, or via a hardware connector.

* * * * *